(12) United States Patent
Van Bodegom et al.

(10) Patent No.: US 9,771,445 B2
(45) Date of Patent: Sep. 26, 2017

(54) PROCESS FOR THE PREPARATION OF AN ETHYLENE COPOLYMER IN A TUBULAR REACTOR

(71) Applicants: SAUDI BASIC INDUSTRIES CORPORATION, Riyadh (SA); SABIC GLOBAL TECHNOLOGIES B.V., Bergen op Zoom (NL); Robert Van Bodegom, Geleen (NL); Joannes Augustinus Maria Van Kan, Geleen (NL); Sjors Slots, Geleen (NL)

(72) Inventors: Robert Van Bodegom, Hoensbroek (NL); Joannes Augustinus Maria Van Kan, Geulle (NL); Sjors Slots, Beesel (NL)

(73) Assignees: SABIC GLOBAL TECHNOLOGIES B.V., Bergen op Zoom (NL); SAUDI BASIC INDUSTRIES CORPORATION, Riyadh (SA)

(*) Notice: Subject to any disclaimer, the term of this patent is extended or adjusted under 35 U.S.C. 154(b) by 0 days.

(21) Appl. No.: 15/300,418

(22) PCT Filed: Mar. 26, 2015

(86) PCT No.: PCT/EP2015/056549
§ 371 (c)(1),
(2) Date: Sep. 29, 2016

(87) PCT Pub. No.: WO2015/150215
PCT Pub. Date: Oct. 8, 2015

(65) Prior Publication Data
US 2017/0121434 A1 May 4, 2017

(30) Foreign Application Priority Data
Mar. 31, 2014 (EP) .................................... 14162693

(51) Int. Cl.
*C08F 2/00* (2006.01)
*C08F 20/06* (2006.01)
(Continued)

(52) U.S. Cl.
CPC ............. *C08F 210/02* (2013.01); *B01J 3/042* (2013.01); *B01J 4/008* (2013.01); *B01J 19/1812* (2013.01);
(Continued)

(58) Field of Classification Search
CPC ........ B01J 3/042; B01J 4/008; B01J 19/1812; B01J 2219/00094; B01J 2219/00108;
(Continued)

(56) References Cited

U.S. PATENT DOCUMENTS 4,721,761 A * 1/1988 Omae .................. C08F 210/00
526/272
5,848,880 A 12/1998 Helmig
(Continued)

FOREIGN PATENT DOCUMENTS

WO 2005065818 A1 7/2005
WO 2006094723 A1 9/2006
(Continued)

OTHER PUBLICATIONS

Giles, Harold et al., "Extrusion Coating and Lamination", Extrusion: The Definitve Processing Guide and Handbook, 2005, pp. 465-468.
(Continued)

*Primary Examiner* — William Cheung
(74) *Attorney, Agent, or Firm* — Cantor Colburn LLP

(57) ABSTRACT

The invention relates to a process a system and a high pressure pump for the preparation of a copolymer of ethylene and a di- or higher functional (meth)acrylate in a tubular reactor, comprising the steps of: injecting ethylene at a
(Continued)

Figure 1:
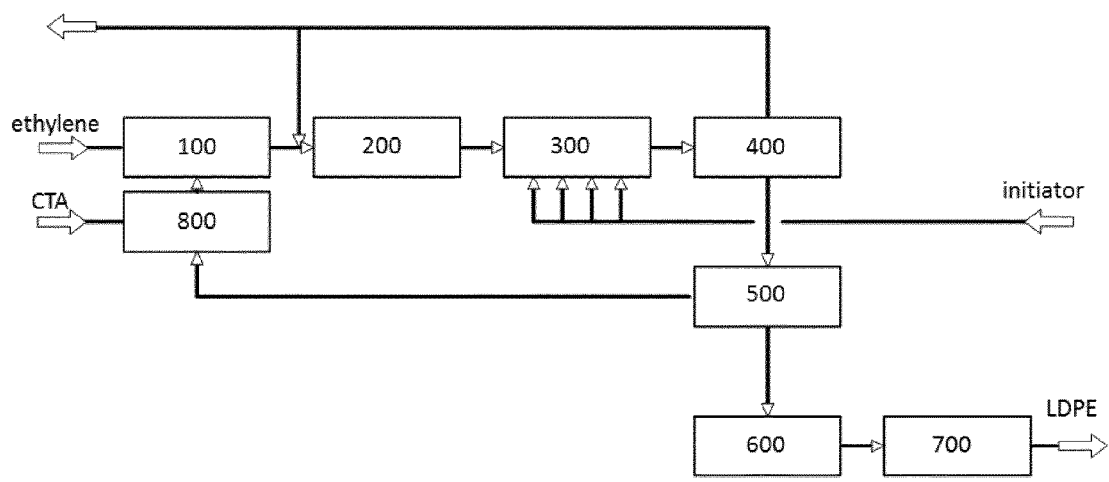

pressure of 100 MPa to 350 MPa into the reactor from a high pressure compressor and injecting the (meth)acrylate at a pressure of 100 MPa to 350 MPa into the reactor from a high pressure pump, wherein the high pressure pump comprises—a pump suction chamber for receiving a medium to be compressed; —a cylinder for receiving the medium to be compressed from the pump suction chamber; —an outlet for discharging a compressed medium from the cylinder, —a seal fixed to the inner wall of the cylinder at an end of the cylinder distal to the outlet and—a plunger movable in the cylinder by sliding through the seal, wherein a leakage gap is present along the plunger and the leakage gap is fluidly connected to the pump suction chamber.

15 Claims, 4 Drawing Sheets

(51) Int. Cl.
*C08F 10/00* (2006.01)
*B01J 19/00* (2006.01)
*C08F 210/02* (2006.01)
*B01J 19/18* (2006.01)
*B01J 3/04* (2006.01)
*B01J 4/00* (2006.01)

(52) U.S. Cl.
CPC ............... *B01J 2219/0077* (2013.01); *B01J 2219/00094* (2013.01); *B01J 2219/00108* (2013.01); *B01J 2219/00159* (2013.01); *B01J 2219/00186* (2013.01); *B01J 2219/00768* (2013.01)

(58) Field of Classification Search
CPC .... B01J 2219/00159; B01J 2219/00186; B01J 2219/00768; B01J 2219/0077; C08F 210/02; C08F 2/00; C08F 2/01; C08F 2222/1013
USPC .................. 526/64, 348, 317.1; 422/131
See application file for complete search history.

(56) References Cited

U.S. PATENT DOCUMENTS

| 5,916,440 | A | 6/1999 | Garcera et al. |
| 7,820,776 | B2 | 10/2010 | Neuteboon et al. |
| 2010/0004407 | A1* | 1/2010 | Goossens ............ B01J 19/2415 526/64 |

FOREIGN PATENT DOCUMENTS

| WO | 2007134670 A1 | 11/2007 |
| WO | 2007134671 A1 | 11/2007 |
| WO | 2011112199 A1 | 9/2011 |

OTHER PUBLICATIONS

International Search Report for International Application No. PCT/EP2015/056549; dated May 22, 2015; 6 pages.
Neilen, Marcel; "Statistical Models to describe the correlations between the molecular mass distribution and the extrusion coating process ability", 2003 TAPPI 9th European Place Conference, May 12-14; Rome.
Peacock, Andrew J., "Handbook of Polyethylene", Chapter 3 Production Processes, 2000, Marcel Dekker, Inc., New York; ISBN 0824795466; p. 43-66.
Written Opinion of the International Search Report for International Application No. PCT/EP2015/056549; dated May 22, 2015; 10 pages.

* cited by examiner

PROCESS FOR THE PREPARATION OF AN ETHYLENE COPOLYMER IN A TUBULAR REACTOR

CROSS REFERENCE TO RELATED APPLICATIONS

This application is a 371 of International Application No. PCT/EP2015/056549, filed Mar. 26, 2015, which claims priority to European Patent Application No. 14162693.7, filed Mar. 31, 2014 both which are incorporated herein by reference in their entirety.

The present invention relates to a process, a system and a high pressure pump for the preparation of a copolymer of ethylene and a monomer copolymerisable therewith.

The production processes of polyethylene are summarised in Handbook of Polyethylene by Andrew Peacock (2000; Dekker; ISBN 0824795466) at pages 43-66. Many types of polyethylene exist. Examples of different classes of polyethylene are high density polyethylene (HDPE), low density polyethylene (LDPE), linear low density polyethylene (LLDPE) and very low density polyethylene (VLDPE).

The low density polyethylene can be used alone, blended or co extruded for a variety of packaging, construction, agricultural, industrial and consumer applications. The largest application of LDPE is in films produced for example by the blown or cast extrusion process in both mono and co extrusions. Films made with LDPE exhibit good optical properties, strength, flexibility, seal ability and chemical inertness. The end-use applications include packaging of bakery items, snack foods, consumer durables, disposable diapers, textiles, agricultural film and shrink film.

Another important technical field of application of LDPE is the extrusion coating process. In the extrusion coating process polymers and substrates are combined to form products with specific synergetic characteristics. The increasing processing and product requirements and quality demands may result in several different problems that can occur in the extrusion coating process. Examples of these problems are edge waving, edge tear, web break, gels, streaks, lacing, transfer thickness variation, machine thickness variation and die deposits. Extrusion coating is understood in the present description and claims as a process of extruding a polymer onto a substrate, as described in "Extrusion: The Definitive Processing Guide and Handbook" by Harold F. Giles, Jr. et. al., William Andrew publishing, ISBN 0-8155-1473-5, p. 465-468. On p. 466, FIG. 47.2, an example of an extrusion coating configuration is described.

Traditionally, only low density polyethylene manufactured on a high pressure autoclave reactor was considered in the technical field of extrusion coating. LDPE obtained with an autoclave process is suitable to be applied in extrusion coating for reasons of processability (web stability, drawdown and neck-in) in relation to the molecular composition (broad distribution, long chain branching) of the polymer.

There has been a development for the production of low density polyethylene suitable for extrusion coating by a high pressure process in a tubular reactor. EP1861434 describes a process for the preparation of a copolymer of ethylene and 1,4-butanedioldimethacrylate (BDDMA) in a tubular reactor which results in a good combination of web stability, neck-in and draw down, adhesion, printability, barrier properties, hot tack and heat-sealing performance.

During the polyethylene high-pressure process in a tubular reactor polyethylene is prepared by radical polymerisation in supercritical ethylene. Metering an initiator such as for example organic peroxide, azodicarboxylic acid ester, azodicarboxylic acid dinitrile and hydrocarbons that decompose into radicals can start the polymerisation. Oxygen and air are also are suitable to serve as an initiator. The ethylene, which is compressed to the desired pressure, flows through the reactor tube which is provided on the outside with a jacket through which cooling water flows in order to remove the developed heat of reaction via the wall. This reactor has a length between for example 1000 meters and 3000 meters and an internal diameter between for example 0.01 meter and 0.10 meter. The incoming ethylene is first heated to the decomposition temperature of the initiator, whereupon an initiator solution is metered and the polymerisation subsequently starts. By controlling the quantity of initiator, the desired peak temperature is attained. Thereafter the mixture cools down and, after the temperature has dropped to a sufficiently low level, initiator is metered one or more times again via one of the initiator injection points.

Downstream from the reactor the obtained product is transported to the product silos after for example extrusion, separation and drying. Owing to the exothermic nature of the reaction, the temperature increases as the reaction proceeds to a maximum peak temperature and considerable heat is evolved. Generally the temperature in the reaction zone of the reactor ranges between 140° C. and 375° C. Generally the reactor inlet pressure ranges between 100 MPa and 350 MPa where reactor inlet pressure refers to the (total) pressure at which the feed stream leaves the compressor and enters the reactor.

In an example of a prior art process for the preparation of a copolymer of ethylene and BDDMA by a high pressure process in a tubular reactor, ethylene is first pressurized by a low pressure compressor to a relatively low pressure, e.g. to 25 MPa. Subsequently, the ethylene is pressurized by a high pressure compressor to a relatively high pressure, e.g. 100 MPa to 350 MPa. The (meth)acrylate is also pressurized to e.g. 25 MPa and fed to the same high pressure compressor as the high pressure compressor for ethylene, to be pressurized to e.g. 100 MPa to 350 MPa. Subsequently the pressurized monomers enter the reactor.

It was found that that there was a tendency for an unusually high level leak gas rate of ethylene gases during the known copolymer preparation process. Unusually high level leak gas rate may lead to unsafe situations and is not desirable. Further, during the maintenance of the system, difficulties in changing of the seals in the high pressure compressor were noted. The seals were glued in the cylinder of the compressor, which resulted in the use of very high mechanical forces for disassembling the seals. Severe fouling of the high pressure compressor was also noted.

It is desirable to provide an ethylene copolymer production process offering improved safety and easier maintenance.

It is an object of the invention to provide a process, system and pump for the preparation of a copolymer of ethylene and a di- or higher functional (meth) acrylate in a tubular reactor, in which the above-mentioned and/or other problems are solved.

Accordingly, the present invention provides a process for the preparation of a copolymer of ethylene and a di- or higher functional (meth) acrylate in a tubular reactor, comprising the steps of: injecting ethylene at a pressure of 100 MPa to 350 MPa into the reactor from a high pressure compressor and injecting the (meth)acrylate at a pressure of 100 MPa to 350 MPa into the reactor from a high pressure pump, wherein the high pressure pump comprises a pump suction chamber for receiving a medium to be compressed;

a cylinder for receiving the medium to be compressed from the pump suction chamber;

an outlet for discharging a compressed medium from the cylinder;

a seal fixed to the inner wall of the cylinder at an end of the cylinder distal to the outlet; and a plunger movable in the cylinder by sliding through the seal, wherein a leakage gap is present along the plunger and the leakage gap is fluidly connected to the pump suction chamber.

The present invention is based on the realization that the meth(acrylate) experiences an unexpectedly high temperature if no measure is taken to counter the temperature rise, which results in polymerization of the meth(acrylate) at undesired locations causing problems mentioned above.

A high pressure pump is in general very well-known. The plunger is held inside the cylinder by the seal between the inner wall of the cylinder and the plunger. The plunger makes a reciprocating motion inside the cylinder, sliding through the seal. The cylinder has an inner space elongated in the axial direction of the cylinder and has an end proximal to the outlet and an opposite end distal to the outlet. The seal is ring-shaped and is provided at the end of the cylinder distal to the outlet. By the reciprocating motion of the plunger, the medium to be compressed is sucked inside the inner space of the cylinder, pressurized and discharged through the outlet. Further details of general operation and construction of a high pressure pump can be found e.g. in U.S. Pat. No. 5,848,880.

The high pressure pump used in the process according to the invention is characterized by a positive leakage along the plunger from the cylinder back to the suction chamber. The leakage gap is present between the plunger and a part of the inner wall of the cylinder, reaching the seal. In this leakage gap, the pressure is reduced from full discharge pressure down to suction pressure. The leak flow rate is limited to a few percent of the total discharged flow of the pump. The deliberate leak prevents the need of a high friction generating seal against high pressure and helps cooling down the plunger. The only seal needed is from the suction chamber pressure to the surroundings of the pump. Here the required sealing forces are limited and thus the heat generated is negligible. The high pressure pump of this type is commercially available e.g. from Hammelmann (Germany) as HDP series with a Dynamic plunger sealing.

Since the heat generated by the reciprocating motion of the plunger through the seal is low, the temperature of the (meth)acrylate does not largely increase. Hence, the polymerization of the (meth) acrylate in the pump is avoided. The pump does not have the seal failure or fouling problems.

In comparison, use of pumps without the positive leak resulted in plugging of the injection point to the reactor by polymerized BDDMA. It appeared that the combination of the pressure and temperature at the injection point was such that the BDDMA polymerized before it even reached inside of the reactor. Although not wishing to be bound by any theory, the inventors attribute this to the friction of the plunger against the seal at a very high pressure causing a very large temperature rise.

Further, according to the process of the invention, the meth(acrylate) is injected to the reactor via a high pressure pump and not via the high pressure compressor for ethylene. Accordingly, the problem of unusually high gas leak rate of ethylene of the high pressure compressor is no longer present. Further, the fouling problem in the high pressure compressor is also no longer present.

In addition, the copolymer obtained according to the process of the invention was found to have a very low gel level.

Preferably, the temperature of the meth(acrylate) is low before entering the high pressure pump. Accordingly, in preferred embodiments of the process of the invention, the (meth)acrylate is cooled before entering the high pressure pump. The (meth)acrylate is preferably fed to the high pressure pump at a temperature of at most 10° C., preferably 0 to 10° C., more preferably 5 to 7° C.

The low starting temperature of the (meth)acrylate advantageously prevents it from reaching a high temperature in the high pressure pump. This minimizes the risk of the polymerization of BDDMA before it is injected to the tubular reactor. This further lowers the risk of the failure of the seal in the pump and other problems.

Preferably, the seal of the pump is made of PTFE. It was found that such seal withstands any thermal attack and/or chemical attack by the (meth)acrylate better than conventional seal made e.g. of (glass filled) PE.

In particularly preferred embodiments, the (meth)acrylate is fed to the high pressure pump at a temperature of at most 10° C. and the seal of the pump is made of PTFE.

Preferably, the meth(acrylate) is fed to the high pressure pump from a feed passage provided with a cooling unit. Preferably, the cooling unit is supplied with chilled water. Chilled water can be provided from any conventional chilled water unit.

The high pressure pump is typically cooled by a flushing oil cooler. Preferably, the flushing oil cooler is supplied with chilled water. This further ensures that the high temperature of the (meth)acrylate in the high pressure pump is prevented.

Preferably, the cooling unit and the flushing oil cooler are supplied with chilled water from a single chilled water unit. Chilled water is efficiently used for cooling and a simple system is achieved.

Preferably, the (meth)acrylate is added to a part of the tubular reactor having a relatively low temperature, e.g. upstream in the axial direction of the reactor. This reduces the risk that of the meth(acrylate) being polymerized before it enters the reactor.

The (meth)acrylate may be injected to the reactor at one injection point or at different injection points downstream in the axial direction of the reactor tube.

In the process according to the invention, ethylene is injected into the reactor from a first high pressure compressor at a pressure of 100 MPa to 350 MPa. The high pressure compressor may be of any known type suitable for pressurizing ethylene to the desired high pressure. The temperature of ethylene before and after being pressurized by the high pressure pump is in principle not critical, but typically the temperature of ethylene after compression is typically 40-90° C.

Suitable conditions of the reaction in the tubular reactor are described e.g. in EP1861434.

Preferably, the polymerisation takes place in a tubular reactor at a peak temperature between 290° C. and 350° C. Preferably, the (meth) acrylate is applied in an amount between 0.008 mol % and 0.200 mol % relative to the amount of the ethylene copolymer. It will be appreciated that the amount of the (meth)acrylate referred relative to the amount of the ethylene copolymer means that the amount of the (meth)acrylate applied is controlled such that the desired amount of (meth)acrylate is achieved in the obtained ethylene copolymer.

Preferably, the (meth) acrylate is applied in an amount between 0.008 mol % and 0.100 mol % relative to the amount of ethylene copolymer.

The preferred amount of the (meth) acrylate results in the desired molecular structure which determines the end performance of the product.

Preferably, the polymerisation takes place in a tubular reactor at a peak temperature between 300° C. and 340° C., more preferably between 310° C. and 330° C.

Preferably, the (meth) acrylate is a difunctional (meth) acrylate. Preferred di(meth)acrylates are 1,4-butane-dioldimethacrylate (BDDMA), hexanediol dimethacrylate (HDDMA), 1,3-butylene glycoldimethacrylate (1,3-BGDMA), ethylene glycol dimethacrylate (EGDMA), dodecanediol dimethacrylate (DDDMA), trimethylol propane trimethacrylate (TMPTMA) and/or trimethacrylate ester (TMA ester).

Particularly preferred meth(acrylate) are 1,4-butane-dioldimethacrylate and/or trimethylol propane trimethacrylate. Most preferred meth(acrylate) is 1,4-butanedioldimethacrylate.

The use of the polymer obtained with the process according to the invention in the extrusion coating process results in improved web stability. Furthermore, the polymer obtained with the process according to the invention has the required rheological properties to ascertain good web width variation, neck in (shrinkage in width of the LDPE web) and draw down (the maximum line speed at which the LDPE web breaks).

It is an advantage of the process according to the invention that an unexpectedly good combination of web stability, neck-in and draw down, adhesion, printability, barrier properties, hot tack and heat-sealing performance is obtained.

The product yield of the polymerisation is high. The polymer obtained with the process according to the invention also results in higher coating speeds in a high and consistent quality of the polymer to avoid waste due to polymer edge instability and web breaks.

The reactor inlet pressure, i.e. the pressure of ethylene injected to the reactor and the pressure of the (meth)acrylate injected to the reactor ranges between 100 MPa and 350 MPa.

A relatively low pressure results in a relatively high degree of long chain branching and in improved web stability. However a relatively low pressure also reduces the solvent capability of ethylene, gives more ethylene-LDPE demixing, gives more deposition of LDPE near the reactor wall, more deterioration of heat transfer will occur and a lower conversion is obtained. Therefore an optimum for the reactor inlet pressure has to be selected.

More preferably the reactor inlet pressure ranges between 150 MPa and 300 MPa.

The polymerisation temperature can be optimally controlled by metering an initiator for example an organic peroxide or a mixture of initiators at one injection point or at different injection points. The man skilled in the art has to determine the suitable initiators or mixture of initiators, the concentration of the initiator and the injection point(s) being most suitable to be used.

To obtain the desired peak temperature the man skilled in the art has to select the initiator (mixture) and the amount of initiator and suitable organic peroxides include for example peroxyester, peroxyketone, peroxyketal and peroxycarbonate such as for example di-2-ethylhexyl-peroxydicarbonate, diacetylperoxydicarbonate, dicyclohexyl-peroxydicarbonate, tert.-amylperpivalate, cumyl perneodecanoate, tert.-butylpemeodecanoate, tert.-butyl perpivalate, tert.-butylper-maleinate, tert.-butylperisononanoate, tert.-butylperbenzoate, tert,-butylperoxy-2-ethylhexanoate.tert.-butyl-hydroperoxide, d-tert. butyl peroxide, di-isopropylbenzol hydroperoxide, di-isononanoyl peroxide, didecanoylperoxide, cumol hydroperoxide, methyl isobutyl ketone hydroperoxide, 2,2-bis-(tert.-butylperoxy)-butane and/or 3,4-dimethyl-3,4-diphenylhexane. Also difunctional or higher functional peroxides may be applied.

Preferably, the peroxide is a difunctional peroxide.

Suitable bifunctional peroxides include for example 2,5-dimethyl-2,5-di-tertiairy-butylperoxyhexane, 2,5-dimethyl-2,5-tertiairy-peroxyhexyne-3,3,6,9-triethyl-3,6,9-trimethyl-1,4,7-triperoxononane, 3,3,6,6,9,9-hexamethyl-1,2,4,5-tetraoxacyclononane, n-ethyl-4,4-di-tertiairy-butylperoxyvalerate, 1,1-di-tertiairy-butylperoxy-3,3,5-trimethylcyclohexane, ethyl-3,3-di-tertiairy-butylperoxybutyrate, 1,1-di-tertiary-butylperoxycyclohexane, 2,2-di-tertiary-butylperoxybutane ethyl-3,3-di-tertair-amylperoxybutyrate, 2,2-di-4,4-di-tertiary-butylperoxycyclohexylpropane, methyl-isobutyl-peroxide, 1,1-di-tertiary-amylperoxycyclohexane, 1,1-di-tertiary-butylperoxycyclohexane, 2,5-di-methyl-2,5-di-2-ethyl-hexanoylperoxyhexane and/or 1,4-di-tertiary-butylperoxycarbocyclohexane may be applied.

The initiator concentration generally ranges between 0.5 ppm (weight) and 100 ppm (weight) relative to the quantity of ethylene. During the polymerisation it is also possible to add for example inhibitors, scavengers and/or a chain regulator (such as for example an alcohol, an aldehyde, a ketone or an aliphatic hydrocarbon). Very suitable chain regulators are isopropyl alcohol, propane, propylene and propione aldehyde.

The reactor may be a tubular polymerisation reactor having the inside surface of the reactor profiled according to for example WO2005/065818. The profile can be provided both on a tube segment and on a coupling between the tube segments. The profile forms a solid and integral body with the tube segment and/or with the coupling.

Generally the density of the obtained LDPE ranges between 910 kg/m$^3$ and 935 kg/m$^3$ (according to ISO 1183) and the melt index ranges between 0.10 dg/minute and 100 dg/minute (according to ISO1133:2005 at 230° C. and 2.16 kg).

Preferably, the copolymer consists of ethylene monomer units and di- or higher functional (meth) acrylate units. However, the copolymer obtained with the process according to the invention may if desired be reacted from, besides the di- or higher functional (meth)acrylate, also other specific co monomers to be able to obtain specific required properties.

The process according to the invention may further comprise the step of extrusion coating of the obtained copolymer on a substrate. The obtained film has an excellent web stability, neck in and draw down.

The web stability, the neck in and the draw down can be determined using the SABIC Pilot Extrusion Coating Line as disclosed in the presentation "Statistical Models to describe the correlations between the molecular mass distribution and the extrusion coating process ability" by Marcel Neilen on the 2003 TAPPI 9th European PLACE Conference, May 12-14, 2003 in Rome. The neck-in is the shrinkage in width of the LDPE web in comparison with the internal die width.

The ethylene copolymer obtained with the tubular process according to the present invention was found to have a very low gel count, as low as less than 5 particles per m$^2$ larger than $600.10^{-6}$ m.

The gel count is determined according to the "DSM K gel count determination 2245" (using a Gottfert single screw equipment without mixing parts, L/D 20 with an internal cylinder diameter of 30 mm, temperature profile of machine 150° C., 180° C., 220° C., 260° C., 260° C., temperature of extruder head 260° C., 260° C., 260° C., 320 mm cast film coat hanger die, die temperature 260° C., screw constant 120 RPM and film thickness 50. $10^{-6}$ m).

The LDPE obtained with the process according to the invention is suitable to be used in extrusion coating applications for coatings on various substrates such as for example paper, board, cloth, aluminium and other materials. The coatings provide for example a very good adhesion, heat sealing performance and moisture barrier to the substrate. Suitable fields of application are for example liquid packaging cartons, aseptic packaging, food packaging, tapes, paper board cups, food carton stock, frozen food and dual oven able trays, pouches, multi wall bags, release papers and photographic papers such as for example ink jet papers.

The process according to the present invention may further comprise the step of applying the obtained polymer in the film segment, for extruded products, in the cast film segment, in packaging applications, in moulding applications for example closures and medical and consumer bottles, in wire and cable coating applications for electrical and communication cables, in foams, in master batches and in blown films.

The object is also achieved in a system for the preparation of a copolymer of ethylene and a di- or higher functional (meth) acrylate in a tubular reactor, the system comprising:
  a tubular reactor;
  a compressor connected to the reactor, the compressor arranged for injecting ethylene at a pressure of 100 MPa to 350 MPa into the reactor from a high pressure compressor;
  a high pressure pump connected to the reactor, the high pressure pump arranged for injecting the (meth)acrylate at a pressure of 100 MPa to 350 MPa into the reactor, the high pressure pump comprising
    a pump suction chamber for receiving a medium to be compressed;
    a cylinder for receiving the medium to be compressed from the pump suction chamber;
    an outlet for discharging a compressed medium from the cylinder,
    a seal fixed to the inner wall of the cylinder at an end of the cylinder distal to the outlet; and
    a plunger movable in the cylinder by sliding through the seal, wherein a leakage gap is present along the plunger and the leakage gap is fluidly connected to the pump suction chamber;
  a first feed passage for feeding ethylene to the compressor;
  a second feed passage for feeding (meth)acrylate to the high pressure pump.

In a preferred embodiment the seal of the high pressure pump is made of PTFE.

In another embodiment, the second feed passage is provided with a cooling unit for cooling (meth)acrylate fed to the high pressure pump.

The object is also achieved in a high pressure pump, the high pressure pump arranged for injecting (meth)acrylate at a pressure of 100 MPa to 350 MPa into a reactor, the high pressure pump comprising
  a pump suction chamber for receiving a medium to be compressed;
  a cylinder for receiving the medium to be compressed from the pump suction chamber;
  an outlet for discharging a compressed medium from the cylinder,
  a seal fixed to the inner wall of the cylinder at an end of the cylinder distal to the outlet; and
  a plunger movable in the cylinder by sliding through the seal, wherein a leakage gap is present along the plunger and the leakage gap is fluidly connected to the pump suction chamber. The seal of the high pressure pump is made of PTFE.

BRIEF DESCRIPTIONS OF THE FIGURES

Figure 2:
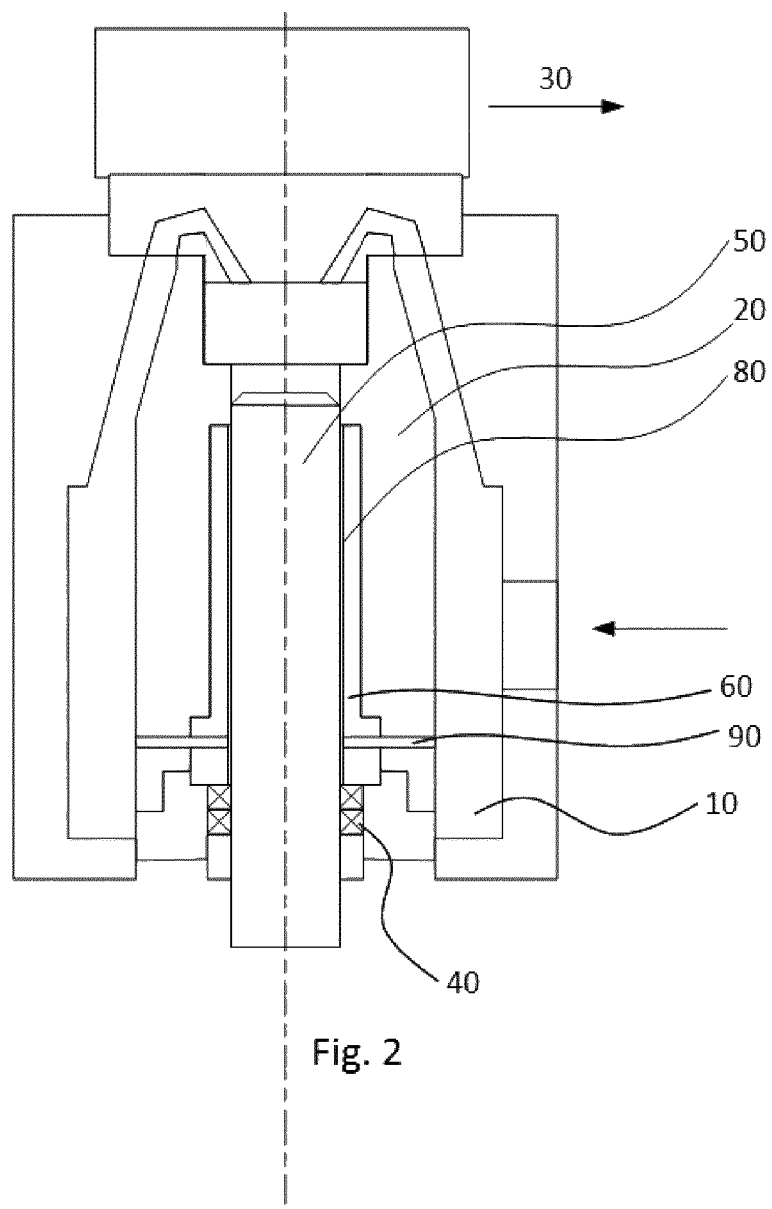
Figure 3:
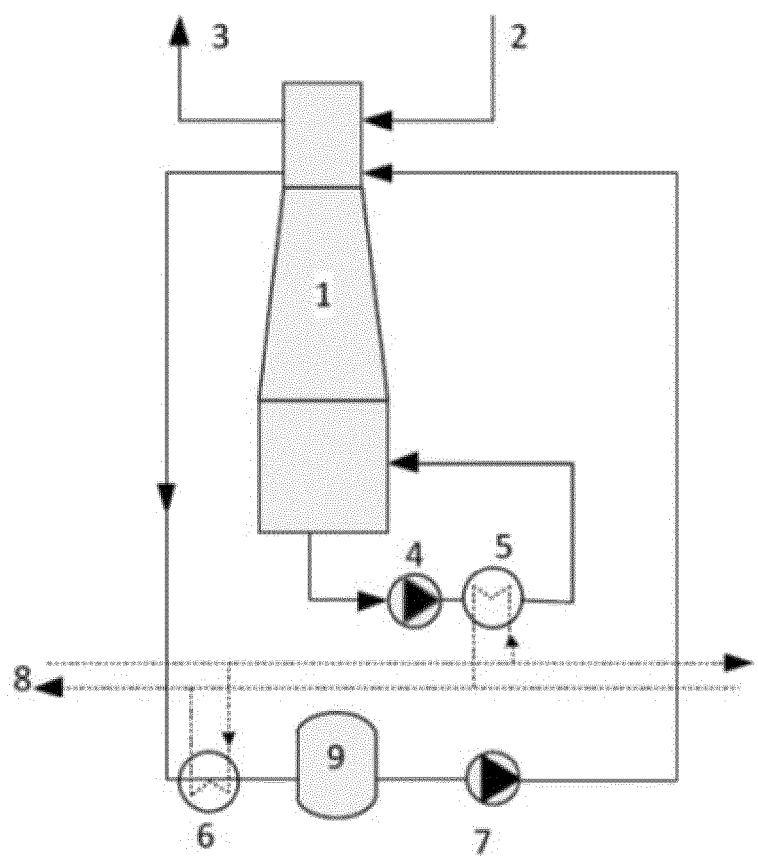
Figure 4:
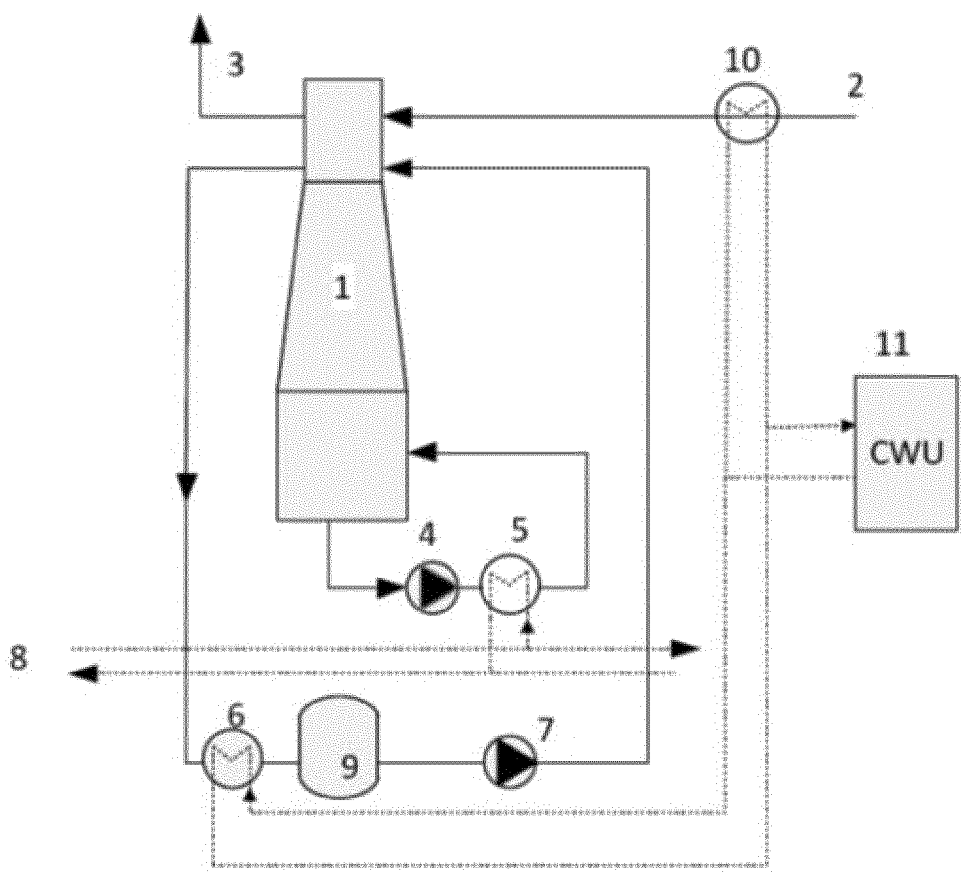

The invention is hereafter described in detail referring to drawings in which:

FIG. 1 schematically illustrates an exemplary scheme for the process for making polyethylene;

FIG. 2 schematically illustrates a cross section of an example of the high pressure pump used in the process of the present invention;

FIG. 3 schematically illustrates an example of a high pressure pump system used in the process according to the invention for compressing the (meth)acrylate for discharging the compressed acrylate into the tubular reactor; and FIG. 4 schematically illustrates a further example of a high pressure pump system used in the process according to the invention for compressing the (meth)acrylate for discharging the compressed acrylate into the tubular reactor;

In FIG. 1, ethylene is first pressurized by a primary compressor 100 to a relatively low pressure, e.g. to 25 MPa. Subsequently, the ethylene is pressurized by a high pressure compressor 200 to a relatively high pressure, e.g. 100 MPa to 350 MPa. The highly pressurized ethylene enters a reactor 300. Initiator is dosed at several injection points of the reactor 300. The obtained stream is separated by a high pressure separator 400 to remove unreacted ethylene.

The removed stream mainly comprising ethylene is fed back to the high pressure compressor 200. Some of the gas stream is purged instead of being fed back to the high pressure compressor 200.

The remaining stream from the high pressure separator 400 is again separated by a low pressure separator 500 to further remove unreacted ethylene. The remaining stream of polyethylene is extruded by an extruder 600 and subsequently subjected to aeration and blending by unit 700, to obtain the desired LDPE.

The stream from the low pressure separator 500 is fed to a booster compressor 800 which receives chain transfer agent. The output from the booster compressor 800 is fed to the low pressure compressor 100.

In the prior art process, the (meth)acrylate is fed to the high pressure compressor 200. In the process according to the present invention, the (meth)acrylate is directly fed to the reactor 300.

FIG. 2 illustrates a cross section of an example of the high pressure pump 1 used in the process of the present invention for the (meth)acrylate. The pump comprises a pump suction chamber 10 for receiving a medium to be compressed, which is meth(acrylate) in the context of the present invention. The pump further comprises a cylinder 20 for receiving the medium to be compressed from the pump suction chamber 10. The pump discharges from its outlet 30 a compressed medium from the cylinder 20, to the inlet of the reactor. The cylinder 20 has an inner space elongated in the axial direction of the cylinder 20, defined by its inner wall. A ring-shaped seal 40 is fixed to the inner wall of the cylinder 20 at an end of the cylinder 20 distal to the outlet 30. The pump further comprises a plunger 50 movable through the cylinder 20 by sliding through the hole of the ring-shaped seal 40.

The inner wall of the cylinder 20 is partly defined by a liner 60. For the purpose of the present invention, the liner 60 is considered to be part of the cylinder 20. Between the plunger 50 and the inner wall of the cylinder 20, a leakage gap 80 is present. The leakage gap 80 is fluidly connected to the pump suction chamber 10 containing non-compressed medium via a passage 90 located in proximity to the seal 40.

The pressure of the medium is high at the outlet 30 of the pump 1 but is continuously reduced in the leakage gap along the longitudinal axis of the plunger 50 in the direction away from the outlet 30. The pressure experienced by the seal 40 situated at the end of the cylinder 20 distal to the outlet 30 is therefore low.

In FIG. 3, a high pressure pump system according to one embodiment of the invention is shown for compressing (meth)acrylate and discharging the compressed (meth)acrylate into the tubular reactor. The system comprises the high pressure pump 1 of FIG. 2 connected to a feed passage 2 from which the pump 1 receives the (meth)acrylate. The high pressure pump 1 is further connected to an outlet line 3 which is in turn connected to the tubular reactor (not shown). The pump 1 discharges the pressurized (meth) acrylate through the outlet line 3 into the reactor. The high pressure pump 1 comprises a crankcase. The crankcase is connected to a crankcase lubrication pump 4 and a crankcase oil cooler 5, which cools the crankcase. Cooling water from a water supply 8 circulates through the crankcase oil cooler 5 to cool the oil circulating through the crankcase. The water supply 8 supplies room temperature water. Cooling oil circulates through a circulation path comprising, in this order, the high pressure pump 1, a flushing oil cooler 6, a flushing oil pump vessel 9 and a flushing oil pump 7. The oil from the flushing oil pump 7 is fed to the high pressure pump 1 again.

In FIG. 4, a high pressure pump system according to a further embodiment of the invention is shown. The system operates in the same manner as the system illustrated in FIG. 3 except for the following.

Unlike the system of FIG. 3, the feed passage 2 is provided with a cooling unit 10. Chilled cooling water from a chilled water unit 11 circulates through the cooling unit 10 to cool the (meth)acrylate fed to the high pressure pump 1. Unlike the water supply 8 which provides room temperature water, the chilled water unit 11 provides chilled water and the (meth)acrylate is preferably cooled to a temperature of at most 10° C.

The flushing oil cooler 6 is also supplied with chilled water from the chilled water unit 11 instead of the water supply 8. This helps in maintaining the temperature of the high pressure pump 1 low and hence the (meth)acrylate in the high pressure pump 1 low.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

The invention is now elucidated by way of the following examples, without however being limited thereto.

COMPARATIVE EXPERIMENT 1

An ethylene copolymer was obtained by polymerising ethylene in a tubular reactor in the presence of 1,4-butanedioldimethacrylate (BDDMA) by a system as schematically illustrated in FIG. 1. Ethylene and the BDDMA were fed to the high pressure compressor 200. Ethylene and the BDDMA were fed to the reactor at 250 MPa from the high pressure compressor 200.

The ethylene copolymer was successfully obtained. However, a failure in the packing in the high pressure compressor 200 was observed. The leakage ethylene gas level was unusually high.

COMPARATIVE EXPERIMENT 2

Comparative experiment was repeated except that the BDDMA was fed to the reactor 300 from a high pressure pump instead of the high pressure compressor 200. The BDDMA was fed from a high pressure pump which does not have a positive leakage along the plunger between the plunger and the inner wall of the cylinder. The high pressure pump was operated in a system as illustrated in FIG. 3. Ethylene was fed to the reactor at 250 MPa from the high pressure compressor 200.

The feeding line for the BDDMA was plugged and the ethylene copolymer was not obtained.

EXAMPLE

Comparative experiment 2 was repeated except that the BDDMA was fed from a high pressure pump as illustrated in FIG. 2, which is HDP75 with a Dynamic plunger sealing from Hammelmann (Germany). The high pressure pump was operated in a system as illustrated in FIG. 3 or FIG. 4. Ethylene was fed to the reactor at 250 MPa from the high pressure compressor 200.

The ethylene copolymer was successfully obtained. No failure in the sealing was observed and the leakage ethylene gas level was at a normal level. The obtained ethylene copolymer had more desirable mechanical properties than the ethylene copolymer obtained from the comparative experiment.

When the high pressure pump was operated in a system as illustrated in FIG. 4, the operation was more stable.

The invention claimed is:

1. A process for the preparation of a copolymer of ethylene and a di- or higher functional (meth) acrylate in a tubular reactor, comprising the steps of: injecting ethylene at a pressure of 100 MPa to 350 MPa into the reactor from a high pressure compressor and injecting the (meth)acrylate at a pressure of 100 MPa to 350 MPa into the reactor from a high pressure pump, wherein the high pressure pump comprises
   a pump suction chamber for receiving a medium to be compressed;
   a cylinder for receiving the medium to be compressed from the pump suction chamber;
   an outlet for discharging a compressed medium from the cylinder, a seal fixed to the inner wall of the cylinder at an end of the cylinder distal to the outlet and a plunger movable in the cylinder by sliding through the seal, wherein a leakage gap is present along the plunger and the leakage gap is fluidly connected to the pump suction chamber.

2. The process according to claim 1, wherein the (meth)acrylate is cooled before entering the high pressure pump.

3. The process according to claim 1, wherein the meth (acrylate) is fed to the high pressure pump at a temperature of at most 10° C.

4. The process according to claim 1, wherein the seal is made of PTFE.

5. The process according to claim 1, wherein the meth (acrylate) is fed to the high pressure pump from a feed passage provided with a cooling unit supplied with chilled water.

6. The process according to claim 1, wherein the high pressure pump is cooled by a flushing oil cooler, wherein the flushing oil cooler is supplied with chilled water.

7. The process according to claim 5, wherein the cooling unit and the flushing oil cooler are supplied with chilled water from a single chilled water unit.

8. The process according to claim 1, wherein the copolymerisation takes place at a peak temperature between 290° C. and 350° C.

9. The process according to claim 1, wherein the (meth)acrylate is applied in an amount between 0.008 mol % and 0.200 mol % relative to the amount of the ethylene copolymer.

10. The process according to claim 1, wherein the (meth)acrylate is 1,4-butanedioldimethacrylate, hexanediol dimethacrylate, 1,3-butylene glycoldimethacrylate, ethylene glycol dimethacrylate and/or dodecanediol dimethacrylate.

11. The process according to claim 1, wherein the (meth)acrylate is 1,4-butanedioldimethacrylate.

12. A system for the preparation of a copolymer of ethylene and a di- or higher functional (meth) acrylate in a tubular reactor, the system comprising:

a tubular reactor;

a compressor connected to the reactor, the compressor arranged for injecting ethylene at a pressure of 100 MPa to 350 MPa into the reactor from a high pressure compressor;

a high pressure pump connected to the reactor, the high pressure pump arranged for injecting the (meth)acrylate at a pressure of 100 MPa to 350 MPa into the reactor, the high pressure pump comprising a pump suction chamber for receiving a medium to be compressed;

a cylinder for receiving the medium to be compressed from the pump suction chamber;

an outlet for discharging a compressed medium from the cylinder, a plunger movable in the cylinder by sliding through the seal, wherein a leakage gap is present along the plunger and the leakage gap is fluidly connected to the pump suction chamber;

a first feed passage for feeding ethylene to the compressor;

a second feed passage for feeding (meth)acrylate to the high pressure pump.

13. The system according to claim 12, wherein the seal of the high pressure pump is made of PTFE.

14. The system according to claim 12, wherein the second feed passage is provided with a cooling unit for cooling the (meth)acrylate fed to the high pressure pump.

15. A high pressure pump, the high pressure pump arranged for injecting (meth)acrylate at a pressure of 100 MPa to 350 MPa into a reactor, the high pressure pump comprising a pump suction chamber for receiving a medium to be compressed;

a cylinder for receiving the medium to be compressed from the pump suction chamber;

an outlet for discharging a compressed medium from the cylinder, a seal fixed to the inner wall of the cylinder at an end of the cylinder distal to the outlet; and a plunger movable in the cylinder by sliding through the seal, wherein a leakage gap is present along the plunger and the leakage gap is fluidly connected to the pump suction chamber, characterized by the seal of the high pressure pump being made of PTFE.

* * * * *